(No Model.)

A. C. DECKER.
BARBED WIRE.

No. 254,539. Patented Mar. 7, 1882.

Witnesses:
Thomas H. Dodge
Geo. R. Cutler.

Inventor:
Alexander C. Decker

UNITED STATES PATENT OFFICE.

ALEXANDER C. DECKER, OF HIGHWOOD, ILLINOIS, ASSIGNOR TO THE WASHBURN & MOEN MANUFACTURING COMPANY, OF WORCESTER, MASSACHUSETTS, AND ISAAC L. ELLWOOD, OF DE KALB, ILLINOIS.

BARBED WIRE.

SPECIFICATION forming part of Letters Patent No. 254,539, dated March 7, 1882.

Application filed January 18, 1882. (No model.)

*To all whom it may concern:*

Be it known that I, ALEXANDER C. DECKER, of Highwood, in the county of Lake and State of Illinois, have invented certain new and useful Improvements in Barbed Wire; and I do hereby declare that the following is a full, clear, and exact description of the same, reference being had to the accompanying drawings, forming a part of this specification, and in which—

Figure 1:
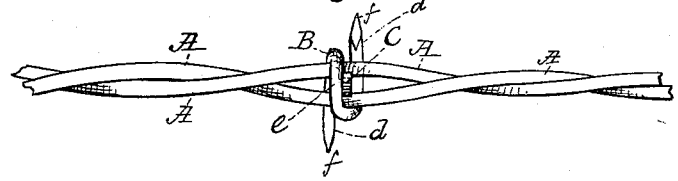
Figure 2:
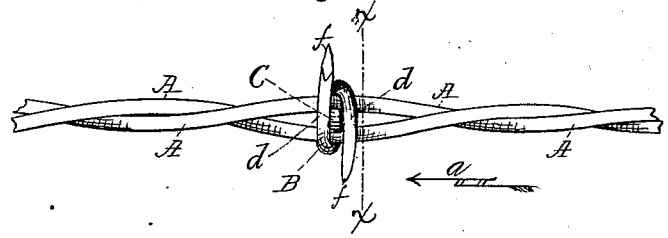
Figure 3:
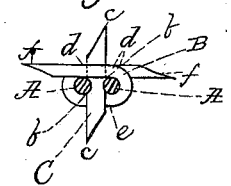

Figure 1 represents a section of my improved barbed wire complete. Fig. 2 represents a view of the opposite side of the section of barbed wire shown in Fig. 1. Fig. 3 represents a section on line $x\ x$, Fig. 2, looking in the direction of arrow $a$ of the same figure.

The nature of my invention consists of two main fence-wires combined with a sheet-metal barb inserted between said main wires, and a barb-wire coiled or twisted about the main wires in such a way as to support and hold the sheet-metal barb in place, the pointed ends of said sheet-metal barb and of the barb-wire extending out in opposite directions, so as to form a four-pointed barb, as will hereinafter be more fully described.

To enable those skilled in the art to which my invention belongs to make and use the same, I will proceed to describe it more in detail.

In the drawings, the parts A A represent the main or longitudinal fence-wires, the part B represents the barb-wire, and the part C the sheet-metal barb. The sheet-metal barb C and the barb-wire B are combined with the wires A A, as fully shown in Fig. 3 of the drawings, in the following manner: The sheet-metal barbs C, being first cut and indented on each edge, as shown at $b\ b$, Fig. 3 of the drawings, are then inserted or thrust between the two main wires A A, when properly extended, said main wires fitting into the grooves or indentations $b\ b$, as shown at Fig. 3 of the drawings. The barb-wire B, after the sheet-metal barb C has been properly inserted between the main wires, as above indicated, is coiled or bent once around the two main wires in such a manner that one of the pointed ends $c$ of the sheet-metal barb C will project out between the barbed ends $d\ d$ of the barb-wire B, said ends pressing against the sides of the sheet-metal barb C, one on each side thereof, while the other end of barb C projects in an opposite direction and has a bearing on one side against the part $e$ of the barb-wire B, as fully shown in the drawings, thus holding the sheet-metal barb C in position, preventing it from slipping or moving in any direction, and at the same time binding the two main wires tightly together. The pointed ends $f\ f$ of the barb-wire B project out in opposite directions from the main wires, and the pointed ends $c\ c$ of the sheet-metal barb C project in opposite directions at right angles from the pointed ends $f\ f$ of the barb-wire B, thereby producing a four-pointed barb, in combination with main wires A A, which, when cabled or twisted together, produce a very effective and desirable fencing material.

If preferred, the sheet-metal barbs may be cut from strips and fed in automatically between the main wires, while the barb-wire may also be fed automatically and cut off in the usual manner of feeding and cutting off barb-wire in the wire-barbing machines now in operation.

The barb-wire B may be cut of sufficient length to encircle the main wires A A twice or more, if desired, and in which case both ends of sheet-metal barb C would be supported by the barb-wire being coiled on each side thereof.

Having described my improvements in barbed wire, what I claim therein as new and of my invention, and desire to secure by Letters Patent, is—

The combination, with the main wires A A, of the sheet-metal barb C, inserted between the main wires, and the barb-wire B, encircling the main wires and supporting the sheet-metal barb C, substantially as shown and described.

ALEXANDER C. DECKER.

Witnesses:
 THOS. H. DODGE,
 GEO. R. CUTLER.